US012738718B2

(12) United States Patent
Pan et al.

(10) Patent No.: US 12,738,718 B2
(45) Date of Patent: Sep. 15, 2026

(54) HIGH VOLTAGE PDU DESIGN

(71) Applicant: Suzhou Littelfuse OVS Co., Ltd., Suzhou (CN)

(72) Inventors: Shangchun Pan, Suzhou (CN); Du Cheng, Suzhou (CN); Renan Liu, Suzhou (CN)

(73) Assignee: Suzhou Littelfuse OVS Co., Ltd., Suzhou (CN)

( * ) Notice: Subject to any disclaimer, the term of this patent is extended or adjusted under 35 U.S.C. 154(b) by 268 days.

(21) Appl. No.: 18/539,445

(22) Filed: Dec. 14, 2023

(65) Prior Publication Data

US 2024/0204492 A1 Jun. 20, 2024

(30) Foreign Application Priority Data

Dec. 20, 2022 (CN) ........................ 202211643225.X

(51) Int. Cl.
*H02B 1/28* (2006.01)
*H02B 1/20* (2006.01)
*H02B 1/46* (2006.01)

(52) U.S. Cl.
CPC ................. *H02B 1/28* (2013.01); *H02B 1/20* (2013.01); *H02B 1/46* (2013.01)

(58) Field of Classification Search
CPC ............... H02B 1/28; H02B 1/20; H02B 1/46
USPC .......................................................... 361/673
See application file for complete search history.

(56) References Cited

U.S. PATENT DOCUMENTS 3,837,120 A * 9/1974 Hanks ................. A47L 15/4263 49/489.1
6,396,769 B1 * 5/2002 Polany ..................... H04R 1/44 367/131
6,526,698 B2 * 3/2003 Park ....................... E05C 19/161 49/489.1
6,995,976 B2 * 2/2006 Richardson ........... G06F 1/1626 220/23.91
7,230,823 B2 * 6/2007 Richardson ........... G06F 1/1626 220/23.91
7,304,236 B1 * 12/2007 Gretz ........................ H02G 3/18 361/600

(Continued)

FOREIGN PATENT DOCUMENTS

KR 20090005289 U 6/2009

OTHER PUBLICATIONS

Extended European Search Report for EP Application No. 23217338.5, dated Jul. 29, 2024, 4 pages.

(Continued)

*Primary Examiner* — Anatoly Vortman
(74) *Attorney, Agent, or Firm* — KDW Firm, PLLC

(57) ABSTRACT

A power distribution unit includes a housing, a cover, and a gasket assembly. The housing, which holds one or more fuses, relays, cables, and busbars, includes a channel located along a perimeter of the housing. The cover is to be placed over the housing. The gasket assembly includes a gasket, multiple gasket ribs, and a gasket connector. The gasket is placed in the channel so that the gasket is sandwiched between the housing and the cover when the cover is placed over the housing. The gasket ribs are located around and attached to the gasket and are placed into gasket rib receivers in the housing. The gasket connector prevents the cover from being secured over the housing without the gasket.

18 Claims, 17 Drawing Sheets

(56) References Cited

U.S. PATENT DOCUMENTS

| | | | | |
|---|---|---|---|---|
| 7,397,668 | B2 * | 7/2008 | Sekine | H01R 9/2608 361/728 |
| 7,420,811 | B2 * | 9/2008 | Chan | F21V 29/763 362/345 |
| 8,139,376 | B2 * | 3/2012 | Sanroma | H05K 7/205 361/753 |
| 8,242,874 | B2 * | 8/2012 | Pavlovic | H01H 85/175 337/194 |
| 9,226,418 | B2 * | 12/2015 | Magno, Jr. | H05K 5/0221 |
| 10,320,129 | B2 * | 6/2019 | Ramunno | H01R 13/688 |
| 11,142,147 | B2 * | 10/2021 | Carnick | H02B 1/48 |
| 11,842,875 | B2 * | 12/2023 | Cheng | H01H 85/0241 |
| 12,165,824 | B2 * | 12/2024 | Cheng | H01H 85/2045 |
| 12,438,343 | B2 * | 10/2025 | Jozwiak | H02B 1/28 |
| 2008/0266812 | A1 * | 10/2008 | Steger | H01L 24/72 361/721 |
| 2008/0276540 | A1 * | 11/2008 | Kim | F25D 23/087 49/478.1 |
| 2011/0084549 | A1 * | 4/2011 | Scheele | H05K 7/026 307/9.1 |
| 2013/0343030 | A1 * | 12/2013 | Hattori | B60R 16/0238 361/824 |
| 2015/0264829 | A1 * | 9/2015 | Christoph | H05K 1/0215 361/753 |
| 2021/0351543 | A1 * | 11/2021 | Genta | H01R 13/512 |
| 2022/0254593 | A1 | 8/2022 | Cheng | |
| 2024/0106205 | A1 * | 3/2024 | Jozwiak | H02B 1/28 |

OTHER PUBLICATIONS

Partial European Search Report for EP Application No. 23217338.5, dated Apr. 29, 2024, 15 pages.

* cited by examiner 112b
112a
130c
132
122d
122e
110a
110b
126c
134c
126f
130b
124
122f
122c
118b
118c
118d
104
120d 122g
126b
134b
118a
122b
122g
120c
130a
108a
120b
108b
134a
108c
126a
126d
122a
122h
100
120a
102
114

300
302
130e
306
130f
132
304
316
308
314
102
310
312

300
130e
302
306
130f
132
308
304
316
314
318
102
310
312
320

HIGH VOLTAGE PDU DESIGN

CROSS-REFERENCE TO CORRESPONDING APPLICATIONS

This application claims the benefit of priority to, Chinese Patent Application No. 202211643225.X, filed Dec. 20, 2022, 2022, entitled "HIGH VOLTAGE PDU DESIGN," which application is incorporated herein by reference in its entirety.

FIELD OF THE DISCLOSURE

Embodiments of the present disclosure relate to power distribution units and, more particularly, to power distribution units suitable for high-voltage applications.

BACKGROUND

Power distribution modules (PDUs) are sealed electrical boxes that are installed into high-voltage applications, such as automotive environments, to ensure circuits are protected, controlled, and/or sensed. PDUs may consist of fuses and relays, for example. The PDUs thus protect and distribute current throughout the environment.

Current is moved around the PDU using an electrical bus. The electrical bus may consist of a network of direct wires, busbars or a combination of wires and busbars. Although the housing of the PDU is aluminum, a plastic support structure may be disposed within the housing to fix the electrical bus.

The PDU may have many fuses and relays which are close to one another. Once connected to the busbars and cables, the configuration within the PDU may be quite complex and the components weighty. Creepage of electrical current between different components may be a concern, particularly due to the high voltages being received into the PDU.

PDUs may be installed in an upright position, or they may be installed sideways, or even upside down. The PDUs house fuses and relays which, by design, may become damaged or destroyed and must then be replaced. Particularly if the PDU is mounted in an upside-down position, a gasket disposed between the housing and a cover may get lost or damaged during the installation of new fuses or relays.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a power distribution unit in accordance with the present disclosure may include a housing, a cover, and a gasket assembly. The housing, which holds one or more fuses, relays, cables, and busbars, includes a channel located along a perimeter of the housing. The cover is to be placed over the housing. The gasket assembly includes a gasket, multiple gasket ribs, and a gasket connector. The gasket is placed in the channel so that the gasket is sandwiched between the housing and the cover when the cover is placed over the housing. The gasket ribs are located around and attached to the gasket and are placed into gasket rib receivers in the housing. The gasket connector prevents the cover from being secured over the housing without the gasket.

Another exemplary embodiment of a power distribution unit in accordance with the present disclosure may include a housing, a cover, and a gasket. The housing holds one or more fuses, relays, busbars, and cables, and has four sides, two long sides and two short sides, where the long sides are parallel to one another and perpendicular to the short sides. The housing also includes first and second ribs, the first rib being located on an inside wall of the first long side and the second rib being located on an inside wall of the second long side. The housing also has a top frame that is located over the first rib and the second rib so that the top frame is perpendicular to the first long side and the second long side of the housing. The cover is secured over an opening of the housing. The gasket is sandwiched between the housing and the cover and forms an airtight seal between the housing and the cover.

DETAILED DESCRIPTION

A novel power distribution unit (PDU) includes several design features suitable for use in high-voltage environments. Larger than legacy PDUs, the novel PDU housing features weight-reducing slots and ribs that both increase strength and prevent warpage of the housing walls, and top frames to increase strength. The plastic support structure within the housing includes features to prevent creepage and ensure clearance between bolts, as well as two different types of stop ribs to minimize the chance of cable terminals touching one another. The new gasket design has many features to ensure that the gasket does not fall out of the housing and prevents the cover from being installed over the housing without the gasket. The gasket assembly further includes an optional gasket connector plate to simplify the manufacture of the housing.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
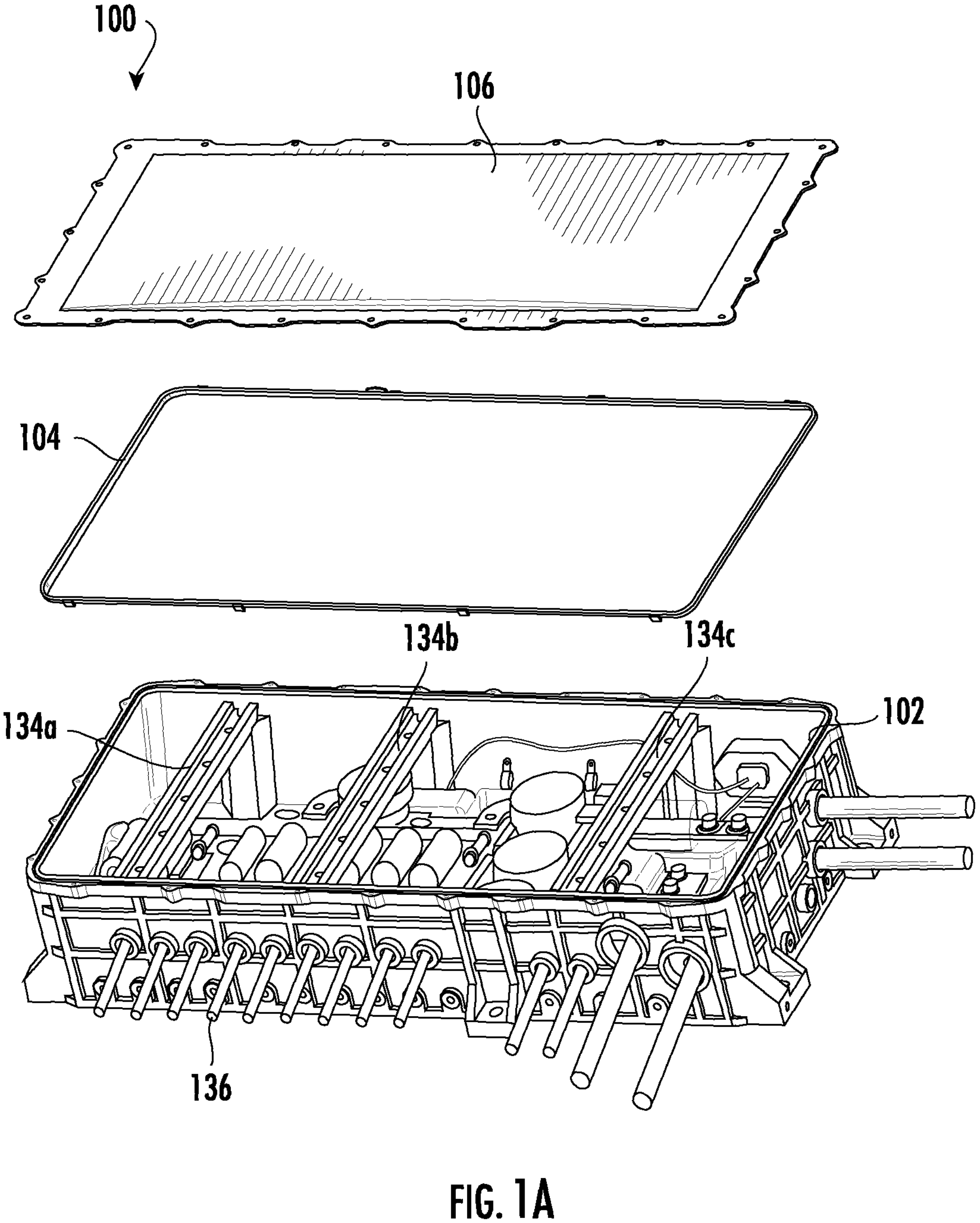
FIGS. 1A-1E are diagrams illustrating a power distribution unit, in accordance with exemplary embodiments.
Figure 1B:
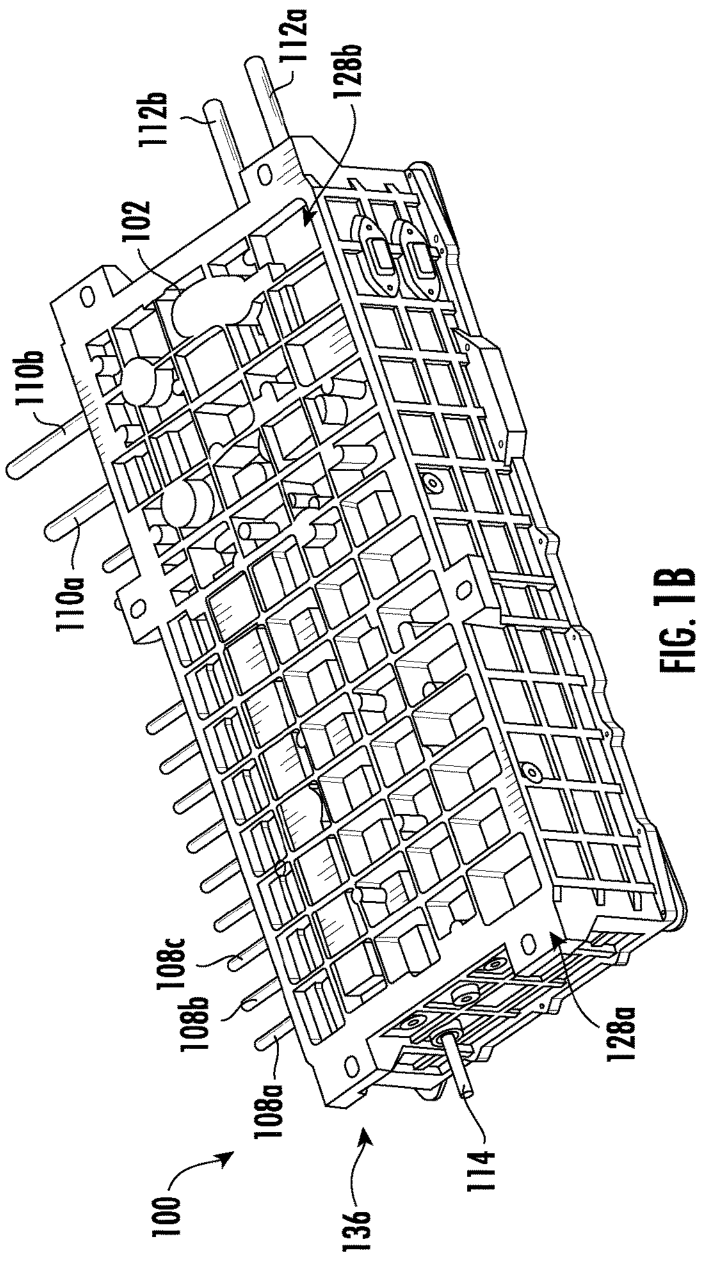
Figure 1C:
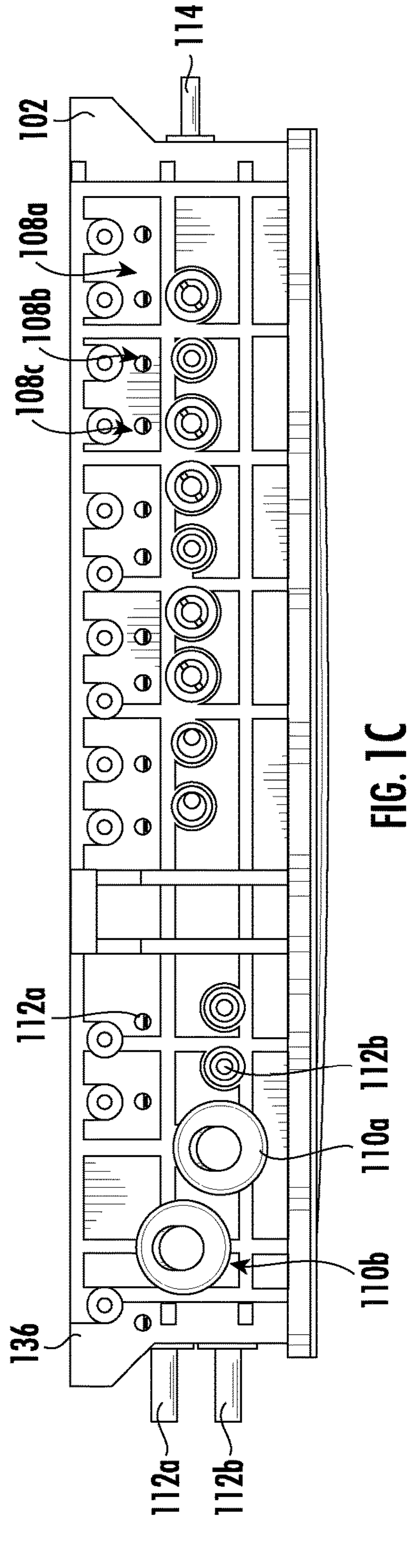
Figure 1D:
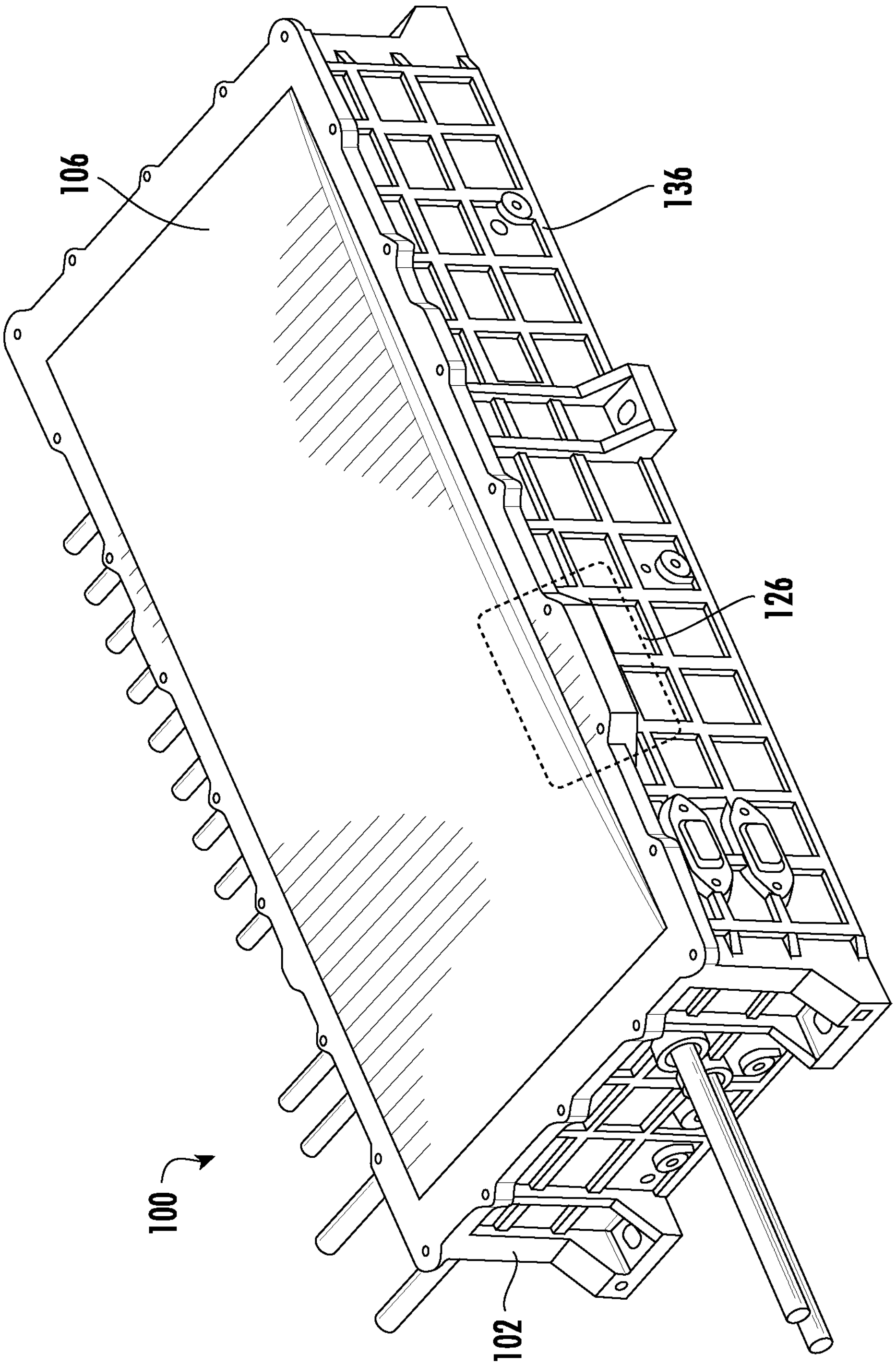
Figure 1E:
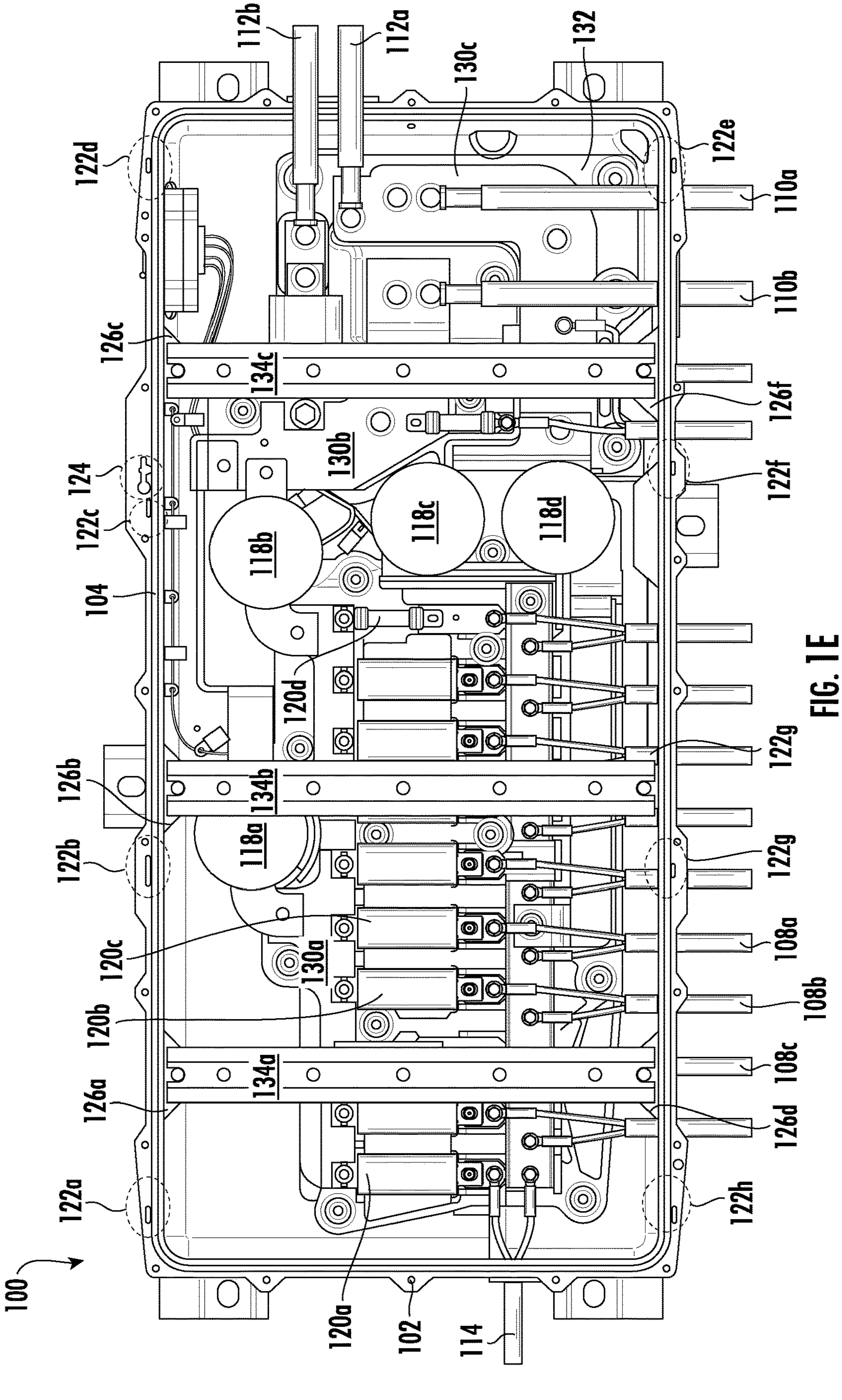

FIGS. 1A-1E are representative drawings of a power distribution unit (PDU) 100 for high-voltage applications, according to exemplary embodiments. FIG. 1A is an exploded perspective view, FIG. 1B is a bottom perspective view, FIG. 1C is a side view, FIG. 1D is a top perspective view with cover, and FIG. 1E is an overhead view of the PDU 100. Designed particularly for high-voltage applications, the PDU 100 is a longer, larger structure and has several additional features not found in legacy PDUs.

PDUs are designed to house fuses and/or relays, which are used to support circuits within the application environment. In an automobile, for example, the PDUs fuses and/or relays may be used to protect and enable air conditioning units, lighting systems, power trains, and so on, of the vehicle. The PDU 100 features a housing 102 in which reside relays 118*a-d* (collectively, "relays 118") and fuses (four of which are indicated) 120*a*-120*d* (collectively, "fuses 120"), as illustrated in FIG. 1E. The relays 118 and fuses 120 may be a single size or may vary in size. The relays 118 and fuses 120 may be connected to one or more busbars, with three busbars 130*a-c* (collectively, "busbars 130") being indicated. The relays 118 and fuses 120 are further connected to cables, which enable coupling to the outside circuitry, with cables 108*a-d*, cables 110*a-b*, cables 112*a-b*, cable 114, and cable 116 being indicated. Some of the cables may be ground or power cables. The number and arrangement of relays 118, fuses 120, and the number and type of cables and busbars may vary, as the PDU 100 may be customized for a particular application or generalized for wide distribution.

As shown in FIG. 1A, in addition to the housing 102, the PDU 100 features a gasket 104 and a cover 106. In exemplary embodiments, the housing 102 and the cover 106 are made of a light-weight aluminum. The PDU 100 further includes a support structure 132, which occupies the interior of the housing 102, helps to hold the busbars 130 in place, and provides additional support to the housing. In exemplary embodiments, the support structure 132 is plastic.

As is typical for legacy PDUs, the PDU 100 may be mounted "upside-down", with the components being opposite to what is shown in FIG. 1A. In automotive applications, for example, the PDU 100 may be mounted to a bottom surface of the vehicle chassis, with a bottom surface 136 of the housing 102 being mounted to the chassis, the gasket 104 being installed around the circumference of the opening of the housing 102 (opposite the bottom surface 136), and the cover 106 being placed over the opening, thus sandwiching the gasket in between the housing and the cover, with the cover and gasket being "underneath" the housing. Alternatively, the PDU 100 may be mounted in an "upright" position or may be mounted to a surface sideways (e.g., orthogonal to the arrangement depicted in FIG. 1A). No matter how the PDU 100 is connected, the special design of the gasket assembly ensures an airtight seal of the cover 106 to the housing 102.

When the legacy PDU is attached in such an upside down arrangement, the cover and, more likely, the gasket may be lost during replacement of the relays or fuses. To address this, in exemplary embodiments, the gasket 104 of the PDU 100 is specially designed to prevent its detachment from the housing 102. Further, the PDU 100 is designed so that the cover 106 will not successfully attach to the housing 102 in the absence of the gasket 104. Gasket ribs 122*a-h* (collectively, "gasket ribs 122") and a gasket connector 124 are visible in the gasket 104 (FIG. 1E). The gasket 104, gasket ribs 122, and gasket connector 124, as well as the features of the housing 102 and cover 106 designed to support the new gasket design, are described in detail in FIGS. 5A-5H and 6A-6B, below. An optional feature in support of the new gasket design is also described in detail in FIGS. 7A-7B, below.

In addition to the many novel features of the gasket 104, the PDU 100 has additional design features not found in legacy PDUs. The exemplary PDU 100 includes cavities, ribs, and top frames in the housing 102, which reduce the weight, reduce possible warpage, and increase the strength of the housing. The support structure 132 includes special walls and ribs to prevent creepage and improve clearance. Each of these features is described in the following pages and illustrations.

Housing Cavities

In exemplary embodiments, the housing 102 is designed with cavities or slots, with cavities 128*a-b* (collectively, "cavities 128") indicated in FIG. 1B. The bottom surface 136 of the PDU 100 has several rows of cavities 128, with five rows being visible along the long side of the housing 102. The shape and size of the cavities may vary, with some cavities being shaped based on component arrangement inside the housing 102. In FIG. 1B, many of the cavities 128 are generally rectangular-cube-shaped voids in the bottom surface 136, although there is quite a bit of variety of both depth and dimension of the cavities 128. Because the PDU 100 is a bit larger than typical legacy PDUs, the cavities 128 provide voids in the bottom surface 136 of the housing, thus decreasing the overall weight of the housing 102.

Housing Ribs

In exemplary embodiments, the PDU 100 features a plurality of ribs along the long sides of the housing 102 to provide both support and prevent warpage. Ribs 126*a-f* (collectively, "ribs 126") are shown in FIG. 1E, with ribs 126*a-c* being disposed on one long side of the housing 102 and ribs 126*d-f* being disposed on the other long side of the housing. An external view of a rib 126 is shown in FIG. 1D. The ribs 126 are described more particularly in FIGS. 2A-2D, below. In exemplary embodiments, the rib 126 are disposed on the long sides of the housing 102, to structurally enhance the housing, and to prevent warpage of the housing. The ribs also provide support for the top frames.

Housing Top Frames

Another feature that addresses the largess of the PDU 100 over legacy PDUs are top frames 134*a-c* (collectively, "top frames 134"), shown in FIG. 1E. In exemplary embodiments, the top frames 134 are disposed orthogonally across the two long sides of the housing 102 and act as braces between the two long sides of the housing 102, thus increasing the strength of the housing. In exemplary embodiments, the top frames 134 are disposed on top of pairs of ribs 126. Thus, top frame 134*a* is disposed between rib 126*a* and rib 126*d*; top frame 134*b* is disposed between rib 126*b* and rib 126*e*; and top frame 134*c* is disposed between rib 126*c* and rib 126*f*. Like the ribs 126, the top frames 134 help to avoid distortion of the housing 102 as well as improving the structural integrity of the housing.

Figure 2A:
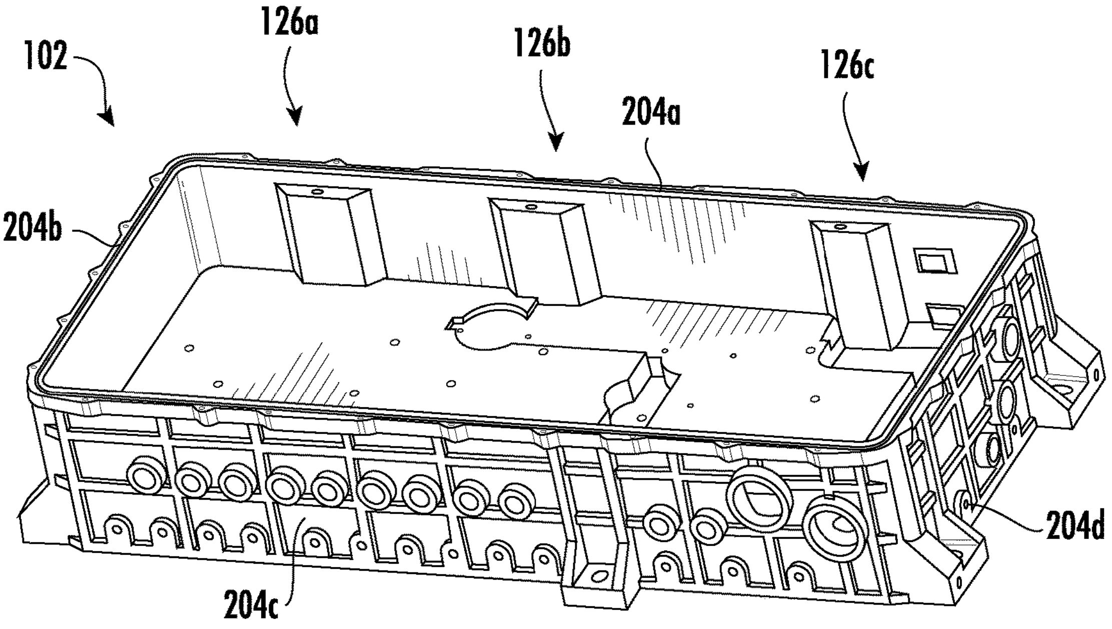
FIGS. 2A-2D are diagrams illustrating a housing for the power distribution unit of FIGS. 1A-1E, in accordance with exemplary embodiments.
Figure 2B:
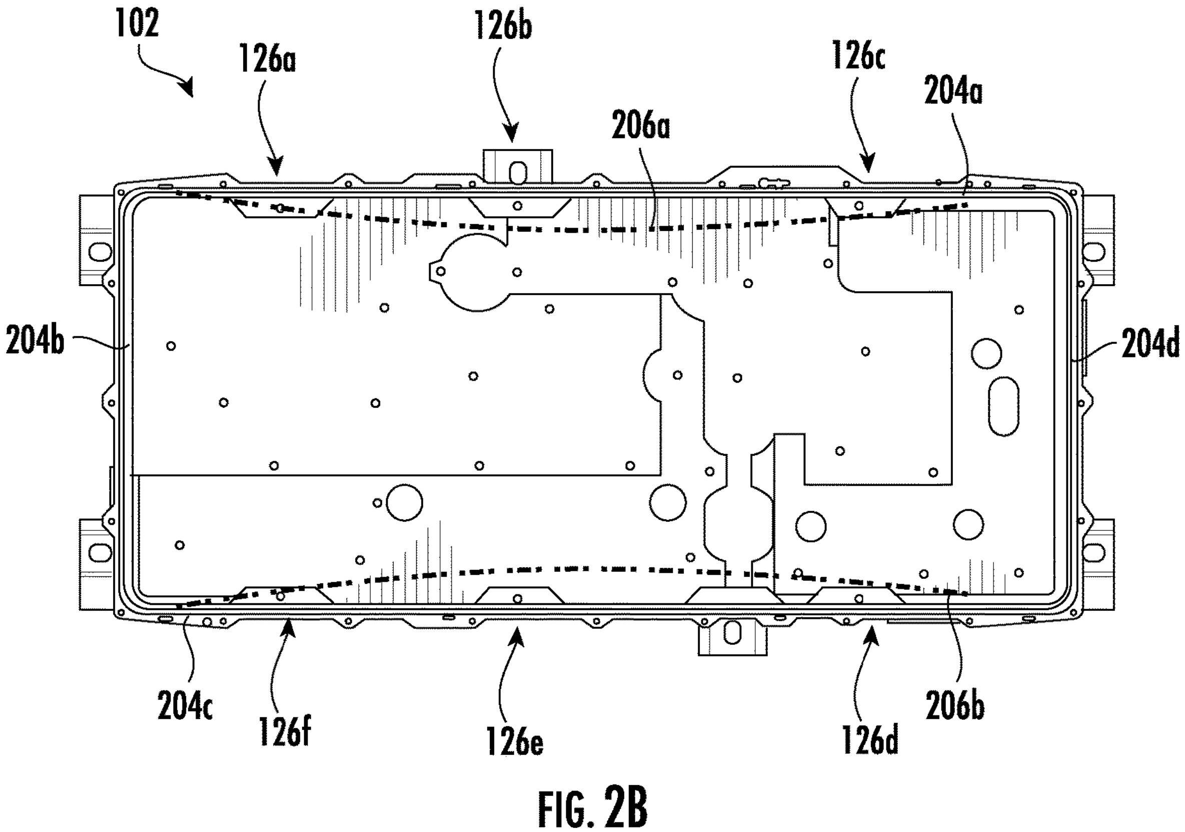
Figure 2C:
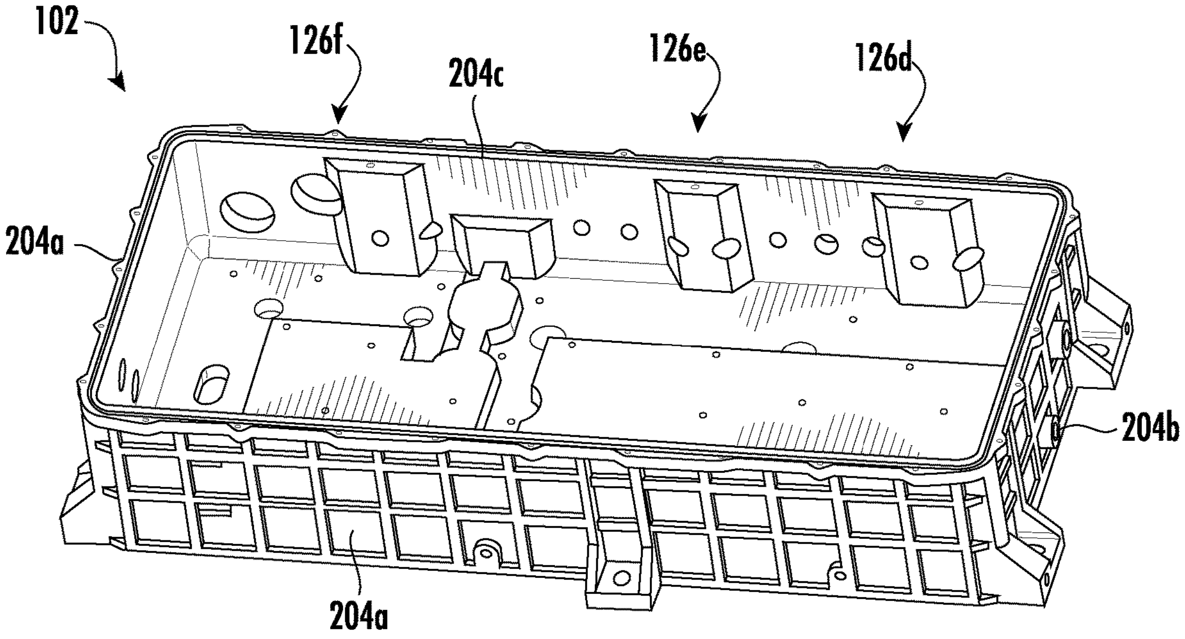
Figure 2D:
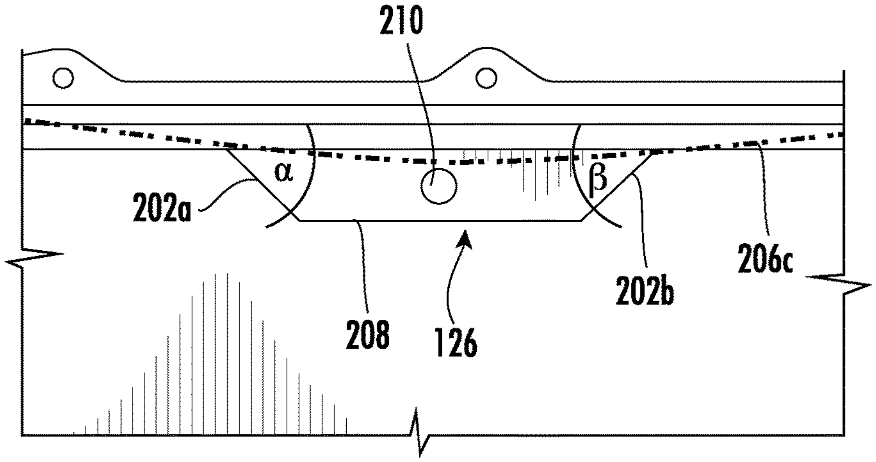

FIGS. 2A-2D are representative drawings of the PDU housing 102 for the PDU 100, according to exemplary embodiments. FIG. 2A is a first side perspective view, FIG. 2B is an overhead view, FIG. 2C is a second side perspective view, and FIG. 2D is a detail view of the housing 102. The already introduced ribs 126 are shown. The housing 102 has four walls 204*a-d* (collectively, "walls 204"), with walls 204*a* and 204*c* being the longer than walls 204*b* and 204*d*.

The wall 204*a* and wall 204*c* may hereinafter be referred to respectively as long wall 204*a* and long wall 204*b*; the wall 204*b* and wall 204*d* may hereinafter be referred to respectively as short wall 204*b* and short wall 204*d*. In a non-limiting example, the ribs 126 are disposed on the long side walls 204*a* and 204*c*. Ribs 126*a-c* are located on the wall 204*a* while ribs 126*d-f* are located on the wall 204*c*.

As illustrated particularly in the overhead detail view of FIG. 2D, in exemplary embodiments, each rib 126 has a trapezoid structure that extends inward from the wall 204 inside the housing 102. A side 202*a* extends away from the wall 204 at a first angle, α, a second side 202*b* extends away from the wall at a second angle, β, and a middle side 208 is parallel to the wall, thus forming the trapezoid shape, with α=β, in a non-limiting embodiment. The ribs 126 each have an aperture 210 disposed approximately in the center of the trapezoid shape, equidistant from the wall 204 and the middle side 208. In other embodiments, the ribs 126 are not trapezoid shaped but still include a side, like the middle side 208, that is parallel to the wall 204. In exemplary embodiments, the ribs 126 are formed along with the housing 102 and are made of aluminum. In some embodiments, the ribs 126 are made separately and attached to the inside walls of the housing 102.

In exemplary embodiments, the ribs 126 both increase the strength of the housing 102, particularly the long walls 204*a* and 204*c* on which they reside. Further, the ribs 126 are designed to prevent warpage of the long walls 204*a* and 204*c* of the housing 102. FIG. 2B includes deflection indicators 206*a* and 206*b* while FIG. 2D includes deflection indicator 206*c* (collectively, "deflection indicators 206"). The deflection indicators 206 show how the respective walls 204*a* and 204*c* (the long walls) of the housing 102 are likely to warp inward without the ribs 126. In exemplary embodiments, the ribs 126 prevent the walls 204*a* and 204*c* from deflecting in this way, thus further strengthening the housing 102.

First Support Structure Enhancement (Special Wall)

Figure 3A:
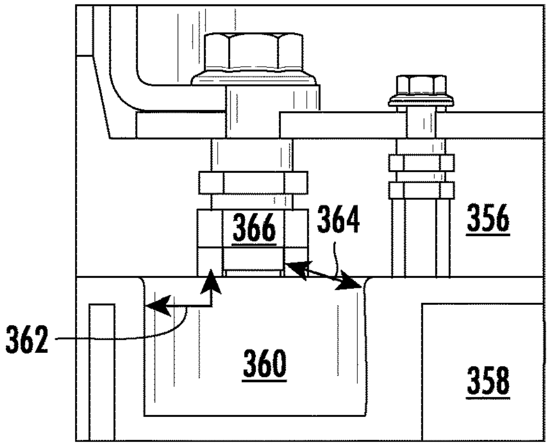
FIGS. 3A-3D are diagrams illustrating a support structure design for the power distribution unit of FIGS. 1A-1E, in accordance with exemplary embodiments.
Figure 3B:
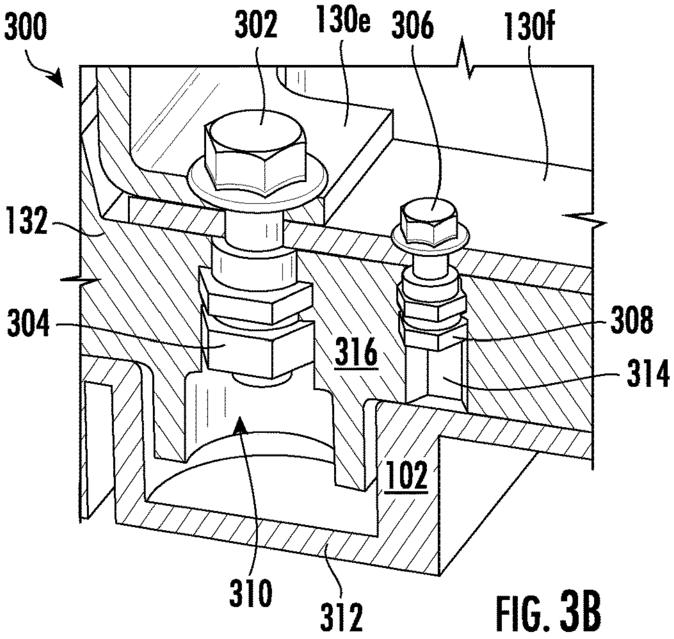
Figure 3C:
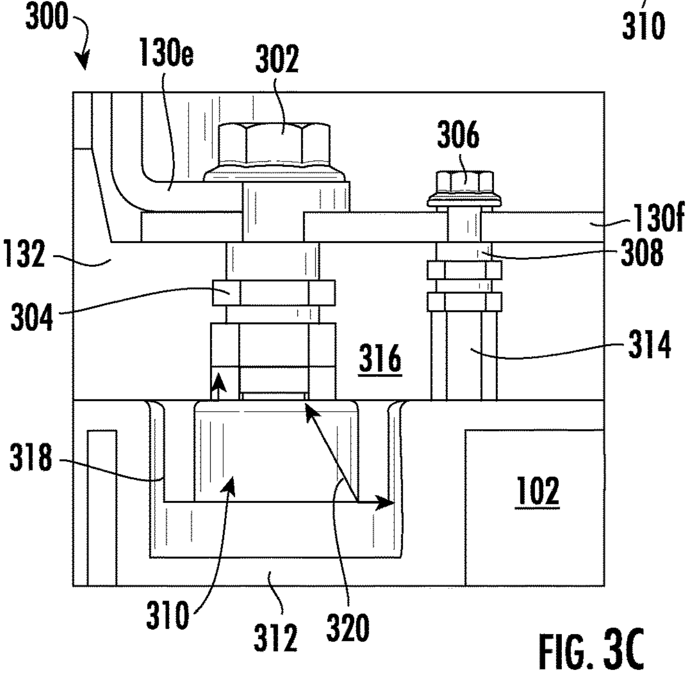
Figure 3D:
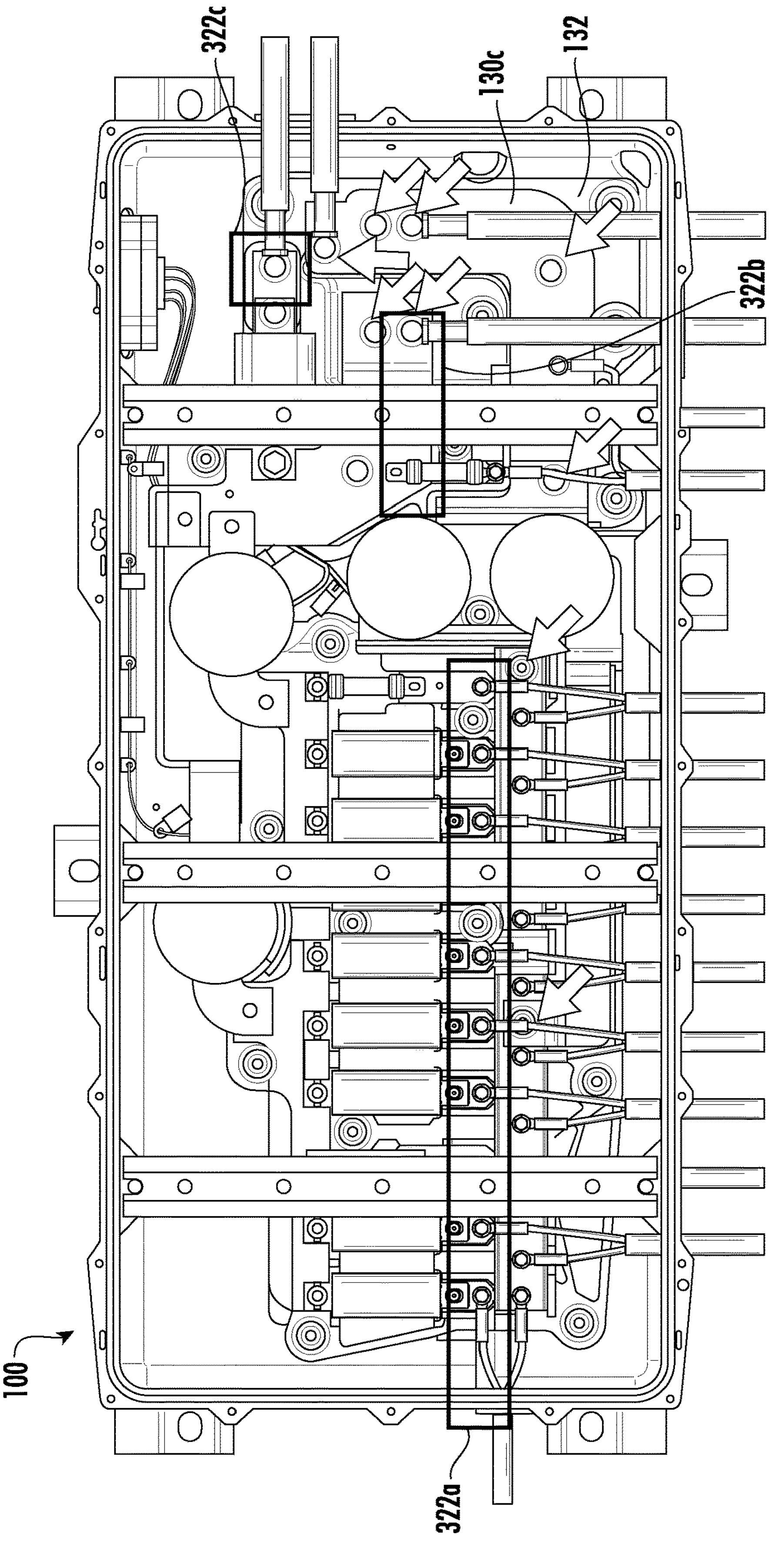

FIGS. 3A-3D are representative drawings of a first PDU support structure 300 for the PDU 100, according to exemplary embodiments. FIG. 3A is a side view of a support structure according to the prior art, FIG. 3B is a cross-sectional perspective view and FIG. 3C is a side view of the novel support structure 300, while FIG. 3D is an overhead view of the PDU, indicating location of the support structures. Recall from FIG. 1E that the PDU 100 includes a support structure 132 that enhances the housing 102, particularly providing a structure for the support and affixation of the busbars 130. Busbar 130*c* is shown in FIG. 3D along with the support structure 132. In several locations, indicated with arrows, the PDU 100 features a first support structure, a special wall in the support structure 132.

FIGS. 3B and 3C show how the support structure 132 is seated on the housing 102. A busbar 130*e* is connected to a busbar 130*f* (collectively, "busbars 130") with a bolt 302 secured by an insert bushing 304. A second bolt 306 is adjacent the busbar 130*f* and secured by an insert bushing 308. In exemplary embodiments, the support structure 132 includes a fastener cavity 310 to contain the insert bushing 304 of the bolt 302 (e.g., larger bolt) and a fastener cavity 314 to contain the insert bushing 308 of the bolt 306 (e.g., smaller bolt). A housing cavity 312 provides a space for the fastener cavity 310, which is formed during injecting molding of the support structure 132. In exemplary embodiments, the bolt 302 is inserted through the busbars 130*e* and 130*f*, then the insert bushing 304 is inserted through the fastener cavity 310 and pushed upward to secure the bolt 302. In exemplary embodiments, the insert bushing 304 is press-fit into the housing cavity 312 when the housing cavity is manufactured by machine process. The insert bushing 304 is insert molded with the fastener cavity 310 when the fastener cavity is formed during injection molding process.

An extension 316 is shown in between fastener cavity 310 and fastener cavity 314. The extension 316 is the "special wall" of the support structure 132 which helps to ensure a clearance between the bolt 302 and the housing 102, where clearance is the shortest distance between two conductive parts in air. In exemplary embodiments, the extension 316 also helps to prevent creepage of current between the bottom of bolt 302 and the housing 102, which is aluminum, where creepage is the distance along a surface.

To understand how the extension 316 in the support structure 132 help with both clearance and creepage, refer to the prior art image of FIG. 3A, which shows a support structure 356 and a housing 358. Instead of having the extension 316, the housing includes the portion 360 which extends beneath an insert bushing 366. Creepage 362, the distance along the surface of the housing 358, is shown, as well as clearance 364, the shortest distance (in air) between the insert bushing 366 and the housing 358.

In comparing the prior art image of FIG. 3A and the PDU support structure 300 (FIG. 3C), both the creepage and the clearance are positively affected by the presence of the extension 316 of the support structure 132. A creepage 318 between the insert bushing 304 and the aluminum housing 102 travels a greater distance than for the creepage 362 of the prior art assembly. Similarly, a clearance 320 between the bolt 302 and the housing 102 is greater than for the clearance 320 of the prior art assembly. Thus, in exemplary embodiments, the extension 316 in the support structure 132, which is plastic, mitigates the creepage of current by increasing the current path between the insert bushing 304 and the housing 102 as well as increasing the clearance of current between bolt 302 and the housing 102. Arrows in FIG. 3D shows that the special wall support structure may be placed in many locations within the PDU 100.

Second Support Structure Enhancement (Stop Ribs)

Figure 4A:
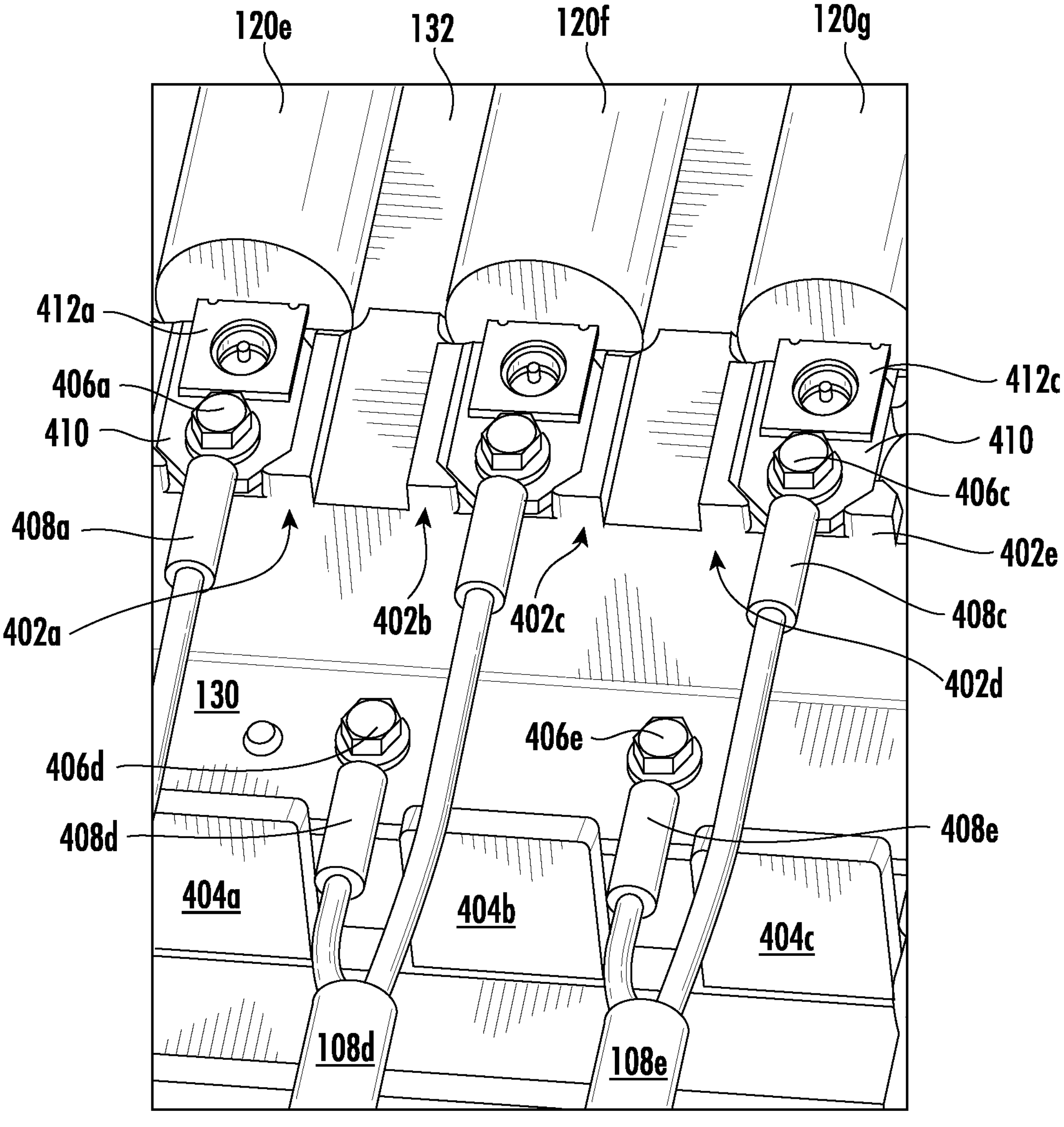
FIGS. 4A-4D are diagrams illustrating a second support structure design for the power distribution unit of FIGS. 1A-1E, in accordance with exemplary embodiments.
Figure 4B:
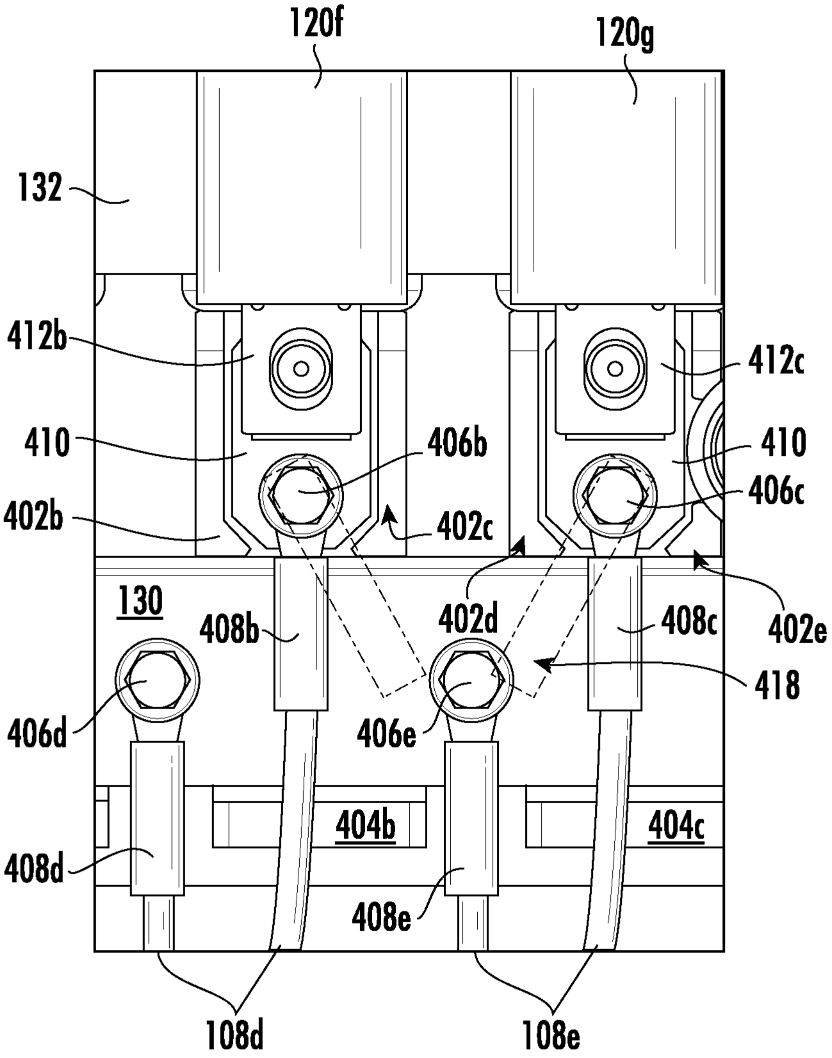
Figure 4C:
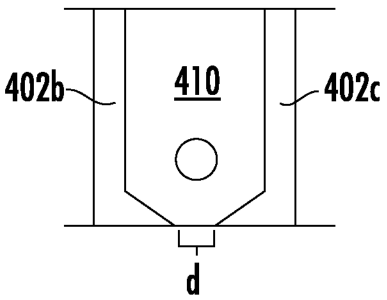
Figure 4D:
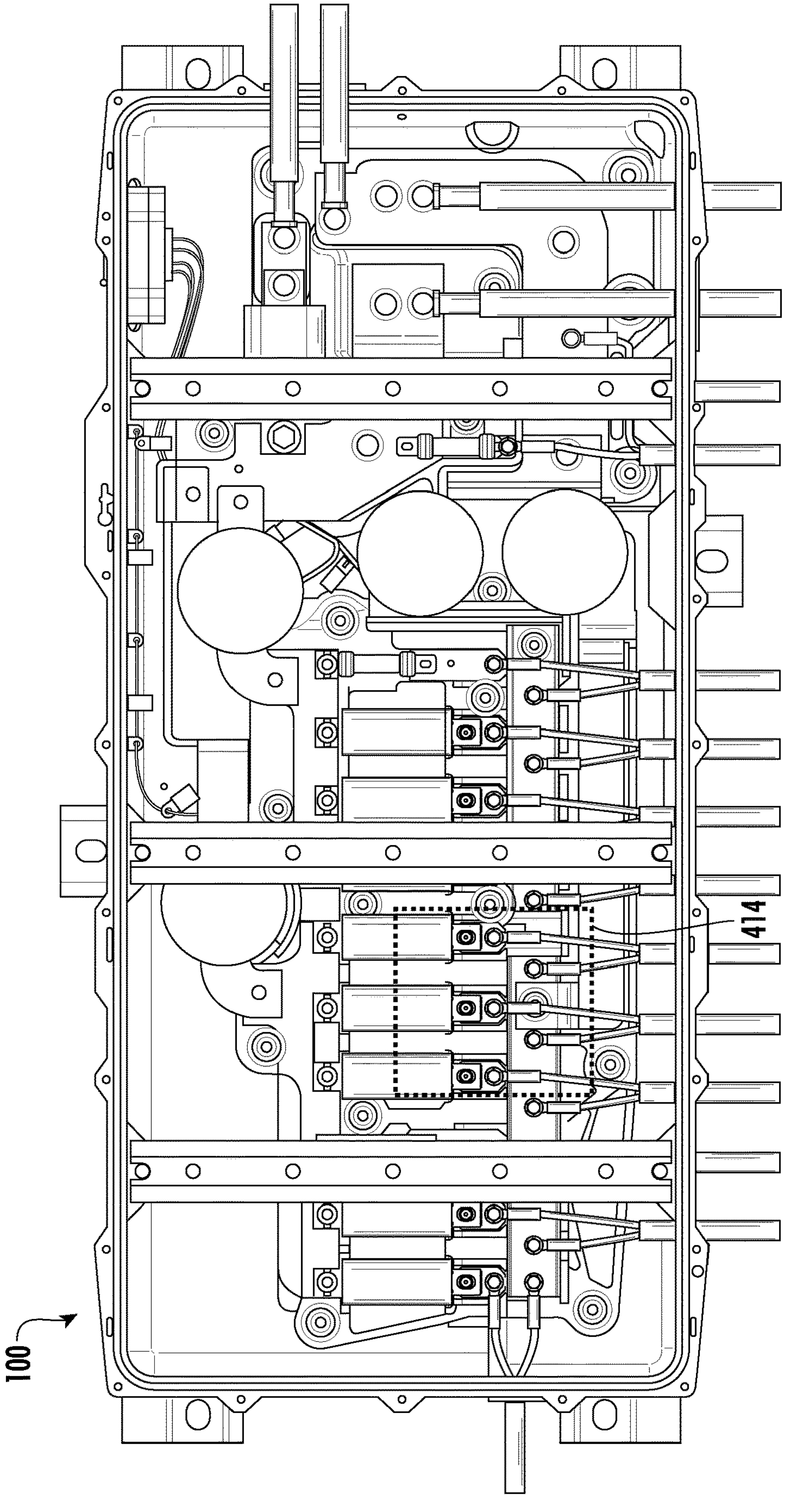

FIGS. 4A-4C are representative drawings of a second PDU support structure for the PDU 100, according to exemplary embodiments. FIG. 4A is a perspective view and FIG. 4B is a side view of the support structure, FIG. 4C is a close-up view of a pair of stop ribs, and FIG. 4D is an overhead view of the PDU, indicating location of the support structure. Fuses 120*e-g* are visible in FIG. 4A with fuses 120*f-g* also being visible in FIG. 4B (collectively, "fuses 120"). Each fuse has a fuse terminal, with fuse terminal 412*a* being part of fuse 120*e*, fuse terminal 412*b* being part of fuse 120*f*, and fuse terminal 412*c* being part of fuse 120*g* (collectively, "fuses 120" and "fuse terminals 412"). The fuse terminals 412*a-c* are connected to respective cable terminals 410*a-c* (collectively, "cable terminals 410").

The fuse terminals 412 connect the fuses 120 to cables which connect to external circuitry needing protection from the fuses. In a non-limiting example, the cables are two-part cables, with cable 108*d* having a first portion with cable terminal 408*d* and bolt 406*d* and a second portion with a cable terminal 408*b* and bolt 406*b* and cable 108*e* having a first portion with cable terminal 408*e* and bolt 406*e* and a second portion with cable terminal 408*c* and bolt 406*c*; cable terminal 408*a* and bolt 406*a* are also part of a two-part cable (shown in FIG. 4D) (collectively, "cables 108", "cable terminals 408", and "bolts 406"). The first portions of the cables 108 are connected to busbar 410 while the second portions are connected to busbar 130. Referring back to FIG.

3D, rectangles 322*a*, 322*b* and 322*c* shows which portion of the cables are positive, with the remaining cables being negative. Thus, the longer portions of the two-part cables are positive while the shorter portions of the two-part cables are negative.

A location indicator 414 is shown in the overhead view of FIG. 4D, with the PDU 100 having many cables, busbars, fuses, and relays in a somewhat crowded/compressed configuration. During installation, it is possible that the end portions of one or more cables 108 may touch the bolt of a different cable or a different cable portion, in the case of two-part cables. Wrong position indicators 418 in FIG. 4B show that, if the ends of the cables are allowed to move significantly from their intended position bolted into the busbar 410, they may accidentally touch the bolt of another cable portion. The cable terminal 408*b* of cable 108*d* or the cable terminal 408*c* of cable 108*e* may accidentally touch the bolt 406*e* of cable 108*e*.

Thus, according to exemplary embodiments, the support structure 132 of the housing 102 of the PDU 100 includes support structures, known herein as stop ribs and stop walls, to prevent these occurrences. In exemplary embodiments, the PDU 100 features: stop ribs 402*a-e* (collectively, "stop ribs 402") and stop walls 404*a-c* (collectively, "stop walls 404"). Stop rib 402*a* is adjacent cable terminal 408*a*, stop ribs 402*b* and 402*c* are disposed on either side of cable terminal 408*b*, and stop ribs 402*d* and 402*e* are disposed on either side of cable terminal 408*c*.

Recall that the support structure 132 of the housing 102 is preferably plastic. Accordingly, the stop ribs 402 and stop walls 404 may be created using injection molding or a similar operation in which molds are made to conform to predefined shapes. Two stop ribs 402 are shaped so that the cable terminals 410 fit snugly between them. FIG. 4C illustrates how stop ribs 402*b* and 402*c* are shaped so that, at the distal end, the stop ribs 402*b* and 402*c* are a distance, d, apart. The stop ribs 402 are thus designed to limit the side-to-side movement of the cable terminals 408 of the cables 108, thus preventing the cable terminals from ending up too close to other cable terminals, as shown by wrong position indicators 418. Side-to-side rotation occurs when, as the bolt 406 is being rotated to secure the cable terminal 408 to the busbar 410, the cable terminal moves in a leftward direction and/or a rightward direction, rather than being stationary. The wrong position indicators 418 in FIG. 4B show side-to-side rotation of the cable terminals 408*b* and 408*c*. As illustrated in FIG. 4A, the stop ribs 402 also have a vertical component, with the stop ribs being raised higher than the busbar 410.

The stop walls 404 are also formed using injection molding operations, in some embodiments, to form vertical structures that, on the one hand, create a space for the first portion of the cables and, on the other hand, raise the second portion of the cables. This both separates the two portions of the cables 108 and, in the case of the first portions, prevents significant side-to-side movement of the first portions. For example, stop walls 404*a* and 404*b* isolate the cable terminal 408*d* of the first portion of cable 108*d* and also minimizes the side-to-side movement of the cable terminal 408*d*. Simultaneously, the stop wall 404*b* raises the second portion of the cable 108*d*, which is longer than the first portion, which has the effect of separating the two portions of the cable 108*d*. The stop walls 404*b* and 404*c* operate similarly for cable 108*e*. Since the stop ribs 402 already limit side-to-side movement of the cable terminals 408 of the second (longer) portion of each cable, the stop walls 404 limit side-to-side movement of the first (shorter) portion of each cable.

Intelligent Gasket Assembly

Figure 6A:
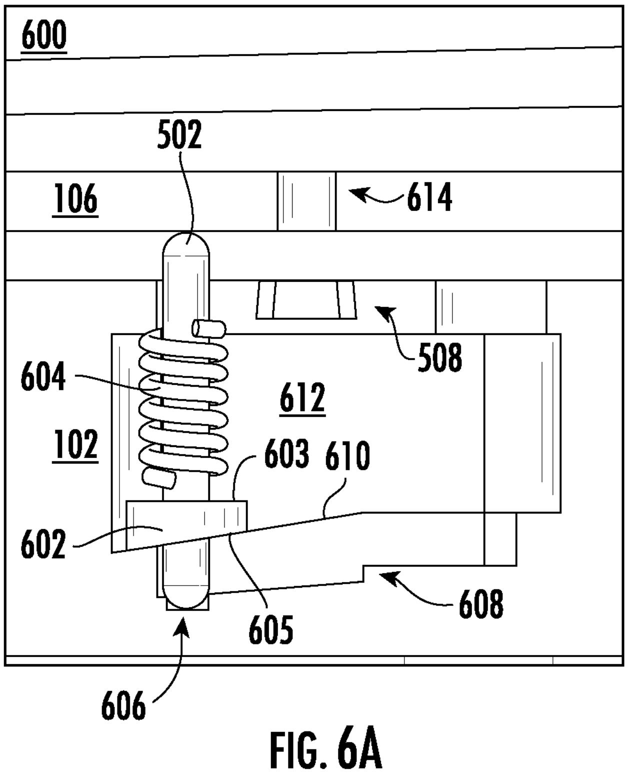
FIGS. 6A-6C are diagrams illustrating a gasket connector assembly for the power distribution unit of FIGS. 1A-1E, in accordance with exemplary embodiments.
Figure 6B:
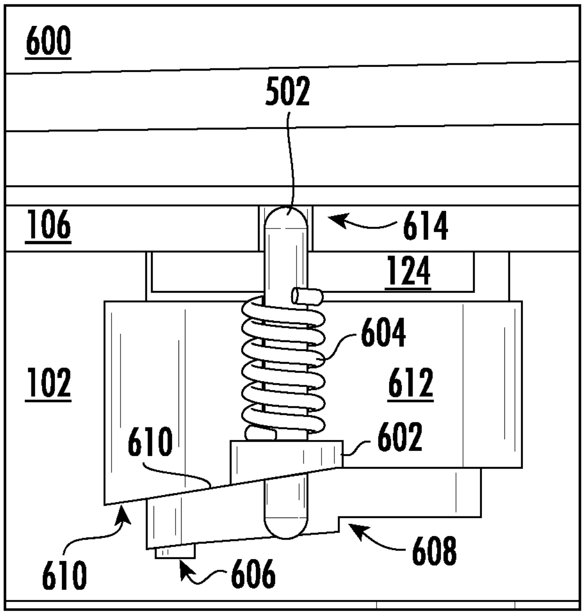
Figure 6C:
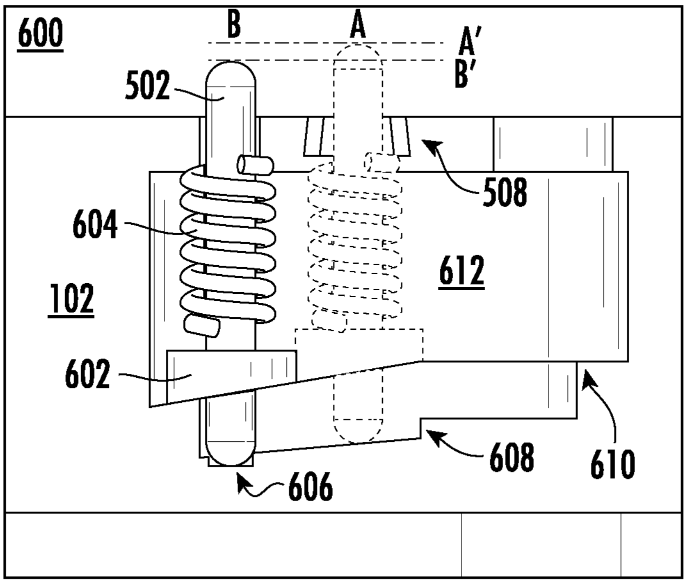
Figure 6D:
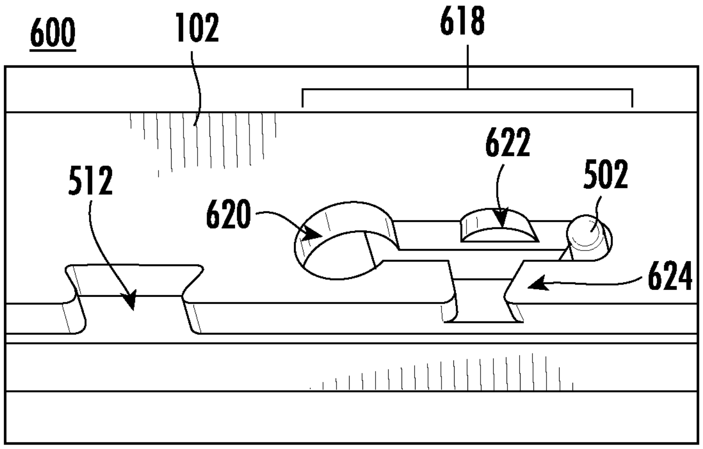
Figure 6E:
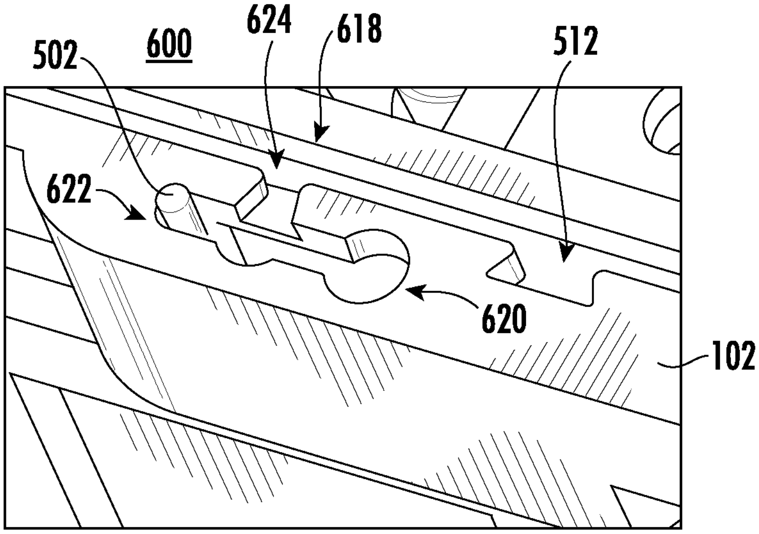
Figure 7A:
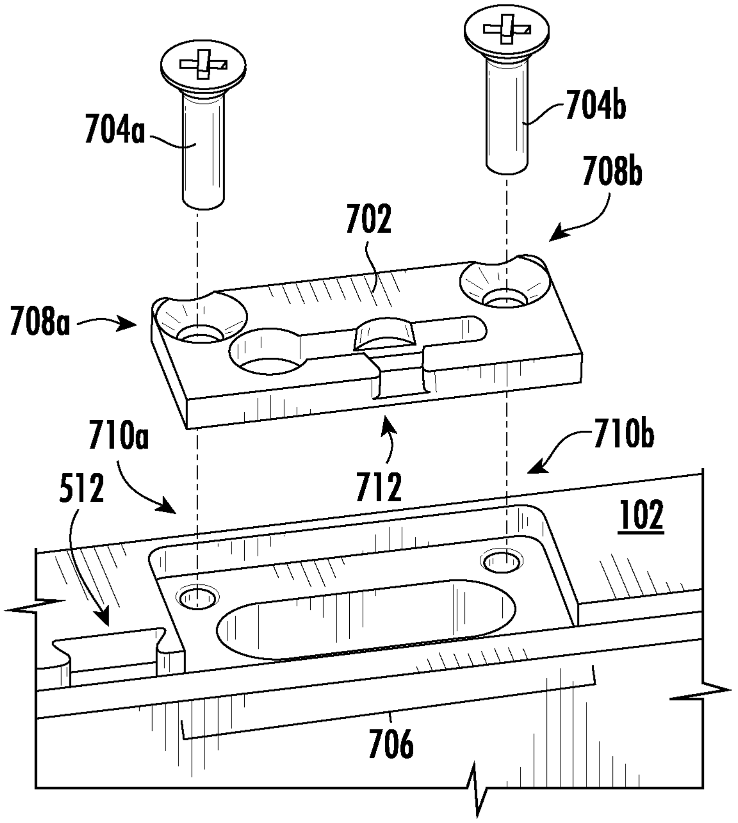
FIGS. 7A-7B are diagrams illustrating an optional gasket connector assembly insert for the power distribution unit of FIGS. 1A-1E, in accordance with exemplary embodiments.
Figure 7B:
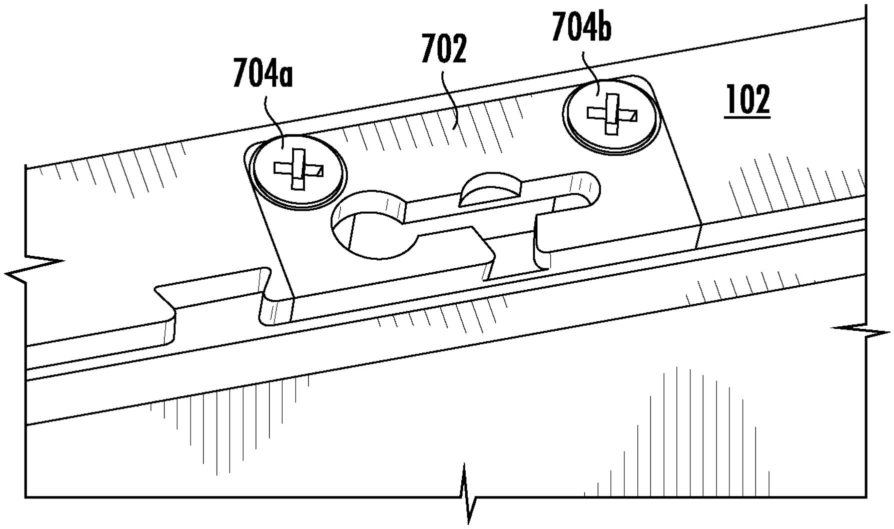

FIGS. 5A-5H, FIGS. 6A-6E, and, optionally, FIGS. 7A-7B, are illustrations of components of a gasket assembly of the PDU 100, according to exemplary embodiments. The gasket assembly consists of the following components: a gasket 104 (also known as the gasket body 104), gasket ribs 122, a gasket connector 124, a pin 502, which includes a base 602, a spring 604 (of the pin 502), a channel 516 (of the housing 102), gasket rib receivers 512 (of the housing 102), a housing cavity 612 including a first slanted floor 608, a second slanted floor 610, a pin stop 606, and a gasket connector receiver 618, and a pin cylinder 614 (of the cover 106). The optional components of the gasket assembly include a gasket connector plate 702 and a gasket connector plate receiver 706 (of the housing 102).

Figure 5A:
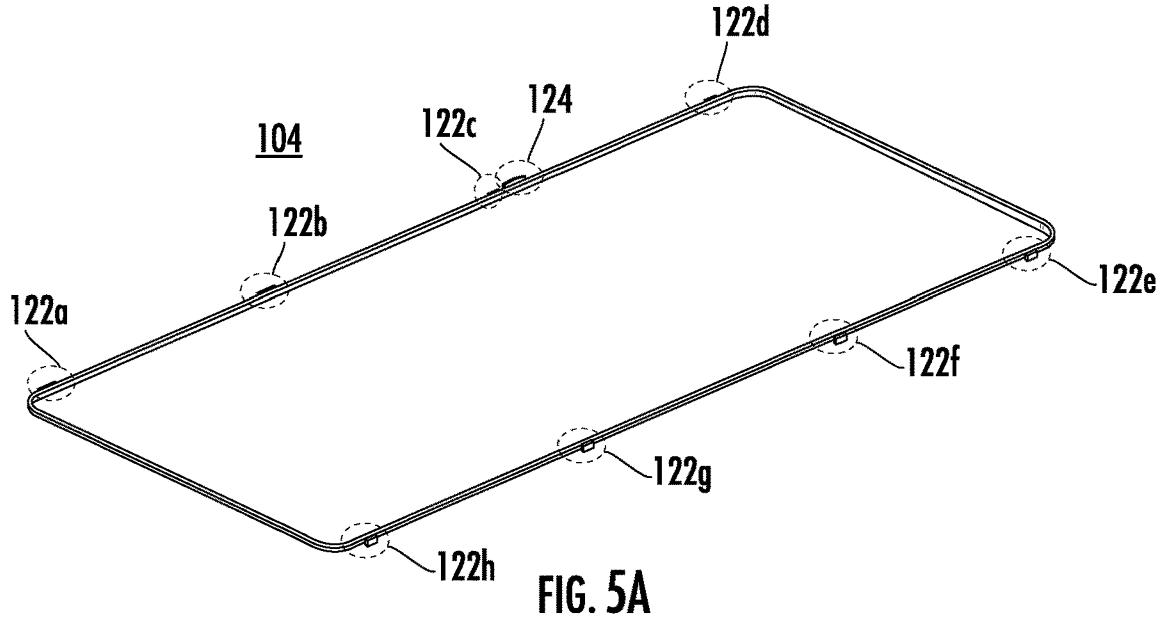
FIGS. 5A-5H are diagrams illustrating a gasket design for the power distribution unit of FIGS. 1A-1E, in accordance with exemplary embodiments.
Figure 5B:
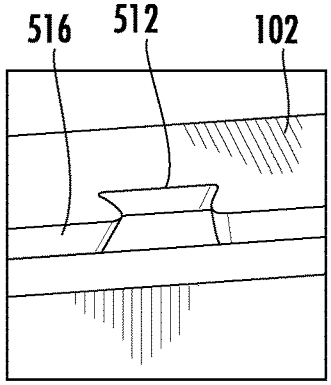
Figure 5C:
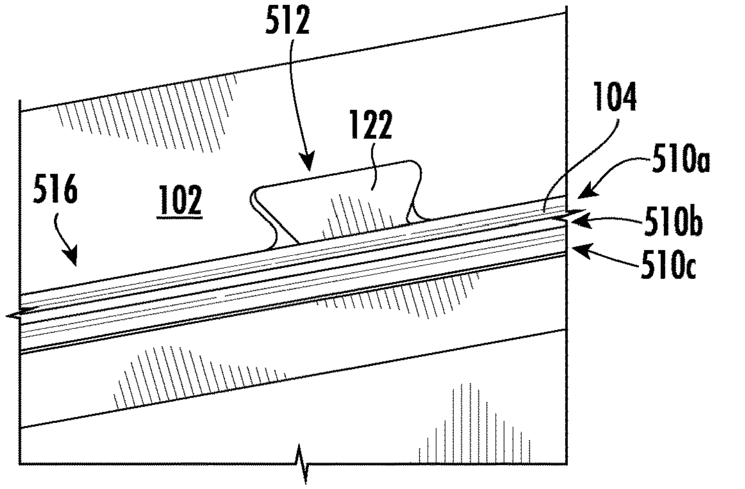
Figure 5D:
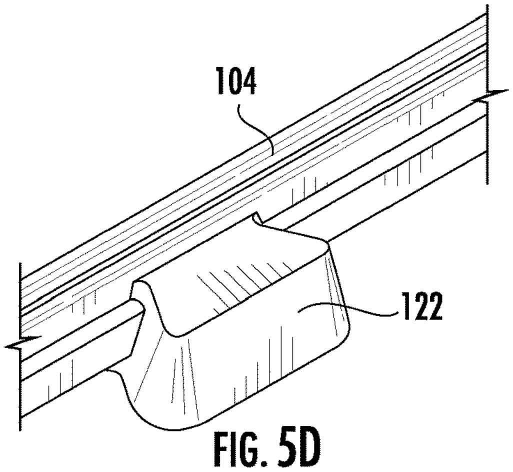
Figure 5E:
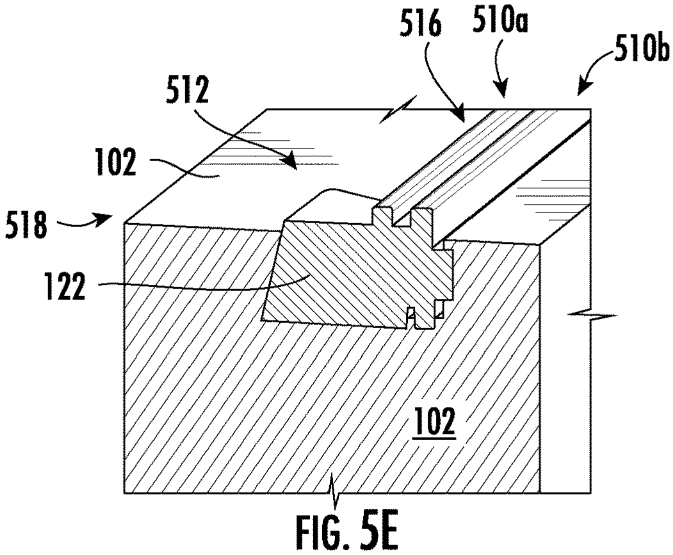
Figure 5F:
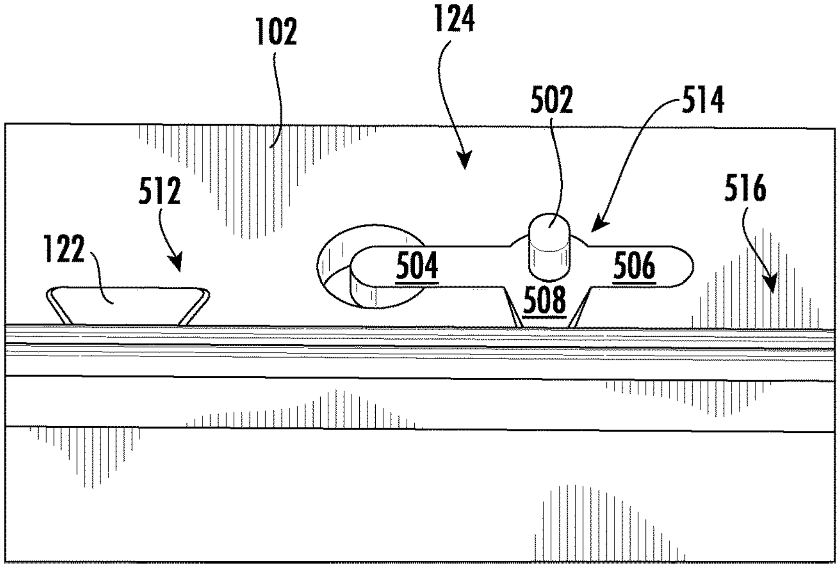
Figure 5G:
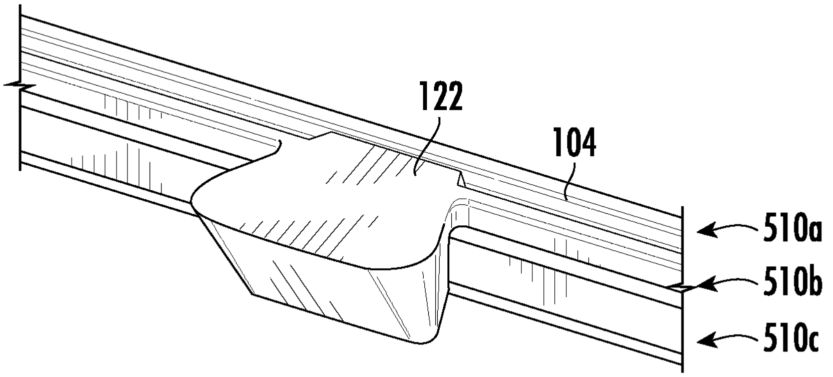
Figure 5H:
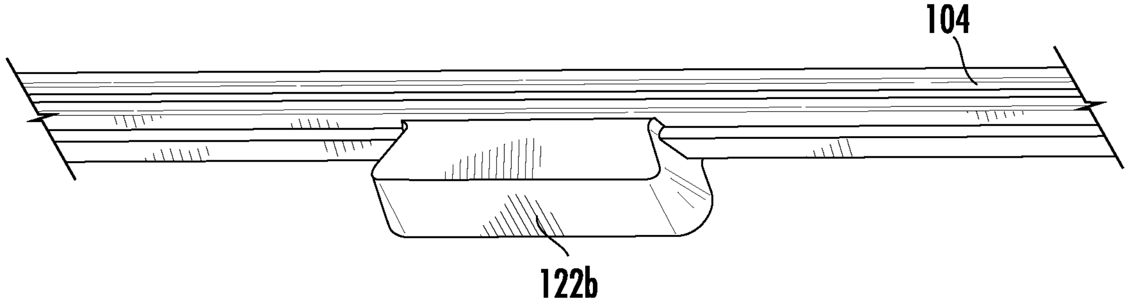

FIGS. 5A-5H are representative drawings of a gasket for the PDU 100, according to exemplary embodiments. FIG. 5A is a perspective view of the gasket; FIG. 5B is a perspective view of the gasket rib holder in the housing 102; FIG. 5C is a perspective view of the gasket ribs inside the gasket rib holder; FIG. 5D is a perspective view of the gasket rib and part of the gasket; FIG. 5E is a cross-sectional perspective view of the gasket ribs inside the gasket ribs holder; FIG. 5F is a perspective view of the gasket rib and gasket connector inside housing; FIG. 5G is a perspective view of the gasket rib and part of the gasket; and FIG. 5H is a perspective view of a long gasket rib and part of the gasket. The gasket assembly, which includes the gasket 104 and the modifications to the housing 102 and cover 106 that enable the gasket assembly, is a clever design that both prevents the gasket 104 from being separated from the housing 102 and, in case the gasket does become removed, prevents the cover 106 from closing over the housing.

Recall that legacy PDUs may be installed bottom-side up. The PDU 100 is designed to also be installed bottom-side up. Whether installed bottom-side up, sideways, or upright, the gasket assembly of the PDU 100 is designed to prevent its separation from the housing 102. Further, legacy PDUs make it possible to install the cover onto the housing, even when the gasket is missing. The PDU 100 gasket assembly is designed to prevent the cover from being installed without the gasket.

The gasket 104, which is placed around the perimeter of the housing 102 (FIG. 1E), may also be known herein as the gasket body (to distinguish from other gasket components). Recall that the gasket 104 features a plurality of gasket ribs 122. The gasket ribs 122 are shown in greater detail in FIGS. 5A, 5C-5E, 5G, and 5H. In a non-limiting embodiment, the gasket ribs 122 are trapezoid-shaped. Notice that gasket rib 122*b* is an elongated trapezoid shape, as compared to the other gasket ribs (cf. FIGS. 5E and 5H). The gasket 104 may have more longer gasket ribs, such as the gasket rib 122*b*, than are shown in FIG. 5A. Or the gasket ribs 122 may be arranged in another way, as the illustration is not meant to be limiting.

In exemplary embodiments, the gasket ribs 122 help to keep the gasket in place in the housing 102. Accordingly, the housing 102 features gasket rib receivers 512 disposed around its perimeter, along its open edge, and a channel 516 disposed along its perimeter, for receiving the gasket 104 (see FIGS. 5B-5C, 5E, and 5F). The gasket ribs 122 are inserted into respective gasket rib receivers 512 around the gasket 104. The gasket ribs 122, gasket rib receivers 512, and channel 516 form the part of the gasket assembly that ensures the gasket body 104 will stay with the housing 102 once the cover 106 is removed, even if the PDU 100 is installed upside down (bottom-side up).

The gasket 104 also features the gasket connector 124, detailed in FIG. 5F. In exemplary embodiments, the gasket connector 124 features a first portion 504, a second portion 506, and a third portion 508, all of which extend from the gasket body 104. The gasket connector 124 also features an aperture 514, which, in some embodiments, is disposed in a plane with the first portion 504 and the second portion 506, for receiving a pin 502. Along with the gasket ribs 122, the gasket connector 124 help to keep the gasket body 104 in place in the housing 102. Additionally, in exemplary embodiments, the gasket connector 124 prevents the cover 106 from being attached to the housing 102 when the gasket body 104 has been removed. The mechanisms by which the gasket connector 124 achieves this result is described in more detail in FIGS. 6A-6C, below.

In exemplary embodiments, as illustrated in FIG. 5G, the gasket body 104 features three gasket levels 510*a-c* (collectively, "gasket levels 510"). The gasket levels 510 provide depth to the gasket body 104 as the gasket body is inserted into the channel 516 of the housing 102. In some embodiments, gasket level 510*c* is thicker (wider) than gasket level 510*b*, which is thicker (wider) than gasket level 510*a*, with the channel 516 of the housing 102 also being thicker (wider) at the bottom of the channel to accommodate the gradation of shape of the gasket body 104. As an alternative, the gasket levels 510*a-c* may be in the same plane as the gasket ribs 122, as shown in FIG. 5C. Or the gasket body 104 may have two levels 510*a* and 510*b*, as shown in FIG. 5E. By having gasket levels 510, the gasket body 104 may be squeezed together to fit into the channel 516 of the housing 102, to ensure a snug fit.

FIG. 5E shows that, in exemplary embodiments, the gasket ribs 122 fit into the gasket rib receivers 512 such that the gasket ribs are planar to a top surface 518 of the housing 102. However, the gasket body 104 is disposed above the top surface 518. This ensures that the gasket 104 provides a buffer between the housing 102 and the cover 106 when the cover is installed over the housing. Although not water-tight, the gasket 104 being disposed above the top surface 518 helps to ensure air-tightness of the PDU 100 once the cover 106 is secured to the housing 102, in some embodiments.

FIGS. 6A-6E are representative drawings of a gasket connector assembly 600 for the PDU 100, according to exemplary embodiments. FIG. 6A is a side view of the gasket connector assembly with the pin in a first position, FIG. 6B is a side view of the gasket connector assembly with the pin in a second position, FIG. 6C is side view of the gasket connector assembly with pin moving from the first position to the second position, and FIGS. 6D-6E are perspective overhead views of the housing portion of the gasket connector assembly. The cover 106 is shown in FIGS. 6A and 6B while the housing 102 in shown in all illustrations. The gasket connector 124 is shown in FIG. 6B.

In exemplary embodiments, the cover 106 features a pin cylinder 614 that is sized to receive the pin 502. In exemplary embodiments, the housing 102 includes a housing cavity 612 which accommodates movement of the pin 502 from a first position (B) to a second position (A) (FIG. 6C). In the top of the housing cavity 612 is shown the third portion 508 of the gasket connector 124 (see FIG. 5F), disposed beneath the pin cylinder 614 of the cover 106. When the gasket connector assembly 600 is in the A position, the pin 502 is disposed in both the pin cylinder 614 (cover 106) and the third portion 508 of the gasket connector 124.

Accompanying the pin 502 is a base 602 and a spring 604, in exemplary embodiments. The pin 502 is a cylindrical shaft and the base 602 has an upper surface 603 that is orthogonal to the pin and a lower surface 605 that is slanted. The spring 604 is wound around the cylindrical shaft. The housing cavity 612 is shaped with the pin 502, the base 602, and the spring 604 in mind.

The housing cavity has a first slanted floor 608 and a second slanted floor 610. The first slanted floor has a pin stop 606 at one end of the slanted floor 608, which is a small cylindrical space inside which the pin 502 is inserted when the pin is in the B position. The base 602 of the pin 502 is slanted at its bottom at a degree similar to the angle of the second slanted floor 610 of the housing cavity 612. When the pin 502 is moved from position A to position B, the base 602 slides along the second slanted floor 610 while the bottom of the pin 502 simultaneously slides along the first slanted floor 608 until it rests inside the cylindrical pin stop 606. The spring 604 makes these actions possible, as the tension of the spring pushes the pin into the pin stop 606 as the pin 502 is slid from the A position to the B position. The pin stop 606 enables the pin 502 to be "locked" at the B location. Notice that the pin 502 is in a lower position, denoted B', when the pin is at the B location while the pin is in a higher position, denoted A', when the pin is at the A location.

With the pin 502 at the B position, the gasket 104 is installed into the housing 102 of the PDU 100. The housing 102 includes a gasket connector receiver 618 for receiving the gasket connector 124. The gasket connector receiver 618 features a first portion 620 for receiving the first portion 504 (where the first portion 620 corresponds to position B of the pin 502) of the gasket connector 124, a second portion 622 for receiving the second portion 506 of the gasket connector, and a third portion 624 for receiving the third portion 508 of the gasket connector (see FIG. 5D for shape of the gasket connector). In exemplary embodiments, the part of the gasket connector receiver 618 that receives the first portion 504 is bulbous, to facilitate insertion of the gasket connector 124 into the gasket connector receiver of the housing 102.

Before installing the gasket 104 is installed into the housing 102, the housing looks like the illustrations of FIGS. 6D-6E, with just the pin 502 and spring 604 visible and in the B position (position 622 of the gasket connector receiver 618). To install the gasket 104, the gasket connector 124 is inserted into the gasket connector receiver 618 of the housing 102. In exemplary embodiments, the gasket 104 including the gasket ribs 122 and the gasket connector 124, is made of an elastic material that can compress somewhat. Thus, upon installation, the gasket connector 124 may be disposed over the pin 502. The pin 502 is then moved from the B position to the A position and inserted until it pokes through the aperture 514 of the gasket connector 124, such as is shown in FIG. 5E. The pin 502 is thus in the A position which is also the third portion 624 of the gasket connector receiver 618. The tension of the spring 604 simplifies the movement of the pin 502. In exemplary embodiments, the pin 502 automatically moves from position A to position B due to the force of the spring 604 when the gasket 104 is removed (or falls away from the housing 102). Once the pin 502 is in the A position, the cover 106 can be attached to the housing 102.

Without the gasket 104, the pin 502 remains in the B position and the cover 106 cannot be attached to the housing 102. FIG. 6A shows that cover 106 is separated from the housing 102 by the pin 502 whereas, in FIG. 6B, the cover 106 is mated with the housing 102. In exemplary embodiments, the pin 502 (in the B position) blocks the cover 106 from being coupled with the housing 102, whereas, in FIG. 6B the pin, in the A position, fits into the pin cylinder 614 and is thus able to be directly coupled to the housing 102.

Optional Gasket Connector Plate

FIGS. 7A-7B are representative drawings of an optional gasket connector plate, according to exemplary embodiments. FIG. 7A is an exploded perspective view of the gasket connector plate before installation and FIG. 7B is a perspective view of the gasket connector plate after installation. Because the housing portion of the gasket assembly is somewhat complex, a gasket connector plate 702 may be used to simplify the upper portion of the housing portion. The housing 102 will still have the housing cavity 612 with the first and second slanted floors 608 and 610, shown in FIGS. 6A-6C.

To simplify the housing cavity 612, the top surface of the housing 102 may be cut with a gasket connector plate receiver 706. In exemplary embodiments, the gasket connector plate receiver 706 is a rounded rectangular structure disposed over the housing cavity 612, with two screw receivers 710*a-b* (collectively, "screw receivers 710"), which are cylindrical structures drilled adjacent the housing cavity.

The gasket connector plate 702 includes a pair of screw apertures 708*a-b* (collectively, "screw apertures 708") and a gasket connector assembly opening 712, which looks much like the gasket connector receiver 618 (FIGS. 6D-6E). The gasket connector plate 702 is inserted into the gasket connector plate receiver 706 and secured to the housing 102 with a pair of screws 704*a-b* (collectively, "screws 704"). In exemplary embodiments, the gasket connector plate 702 is made of aluminum, stainless steel, or hard plastic.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claims. Accordingly, it is intended that the present disclosure is not limited to the described embodiments, but that it has the full scope defined by the language of the following claims, and equivalents thereof.

The invention claimed is:

1. A power distribution unit (PDU) comprising:

a housing comprising a channel disposed along a perimeter of the housing, the housing holding one or more fuses and one or more relays;

a cover placed over the housing; and a gasket assembly comprising:

a gasket placed in the channel, wherein the gasket is sandwiched between the housing and the cover;

a plurality of gasket ribs disposed around and attached to the gasket, the gasket ribs extending into gasket rib receivers in the housing;

a gasket connector ensuring the gasket is in the channel before the cover is secured over the housing;

a pin comprising a cylindrical shaft;

a base comprising an upper surface orthogonal to the pin and a slanted lower surface;

a spring wound around the cylindrical shaft; and a housing cavity comprising:

a first slanted floor, wherein the slanted lower surface of the pin slides along the first slanted floor;

a second slanted floor disposed beneath the first slanted floor, wherein a bottom portion of the pin slides along the second slanted floor; and a pin stop located at one end of the second slanted floor, wherein the pin rests in the pin stop when in a first position.

2. The PDU of claim 1, the gasket connector further comprising a pin aperture through which the pin is inserted.

3. The PDU of claim 1, wherein the gasket connector is inserted into a gasket connector receiver in the housing.

4. The PDU of claim 1, the housing cavity further comprising a first portion, a second portion, and a third portion, wherein the pin rests in the third portion when in a second position.

5. The PDU of claim 4, wherein the cover cannot be secured to the housing when the pin is in the first position.

6. The PDU of claim 4, wherein the cover can be secured to the housing when the pin is in the second position.

7. The PDU of claim 6, the cover further comprising a second pin cylinder, wherein the cover cannot be secured to the housing unless the pin is in the second pin cylinder.

8. The PDU of claim 1, further comprising a support structure disposed within the housing, wherein the support structure comprises:

a first fastener cavity containing a bolt, wherein the bolt affixes a busbar to the support structure;

a second fastener cavity containing a second bolt, wherein the second bolt affixes the busbar to the support structure; and an extension of the support structure between the first fastener cavity and the second fastener cavity.

9. The PDU of claim 1, further comprising a support structure disposed within the housing, wherein the support structure comprises:

a first stop rib disposed on one side of a busbar, the busbar connected to a fuse; and a second stop rib disposed on a second side of the busbar;

wherein the first stop rib and the second stop rib limit side-to-side rotation of a cable terminal.

10. The PDU of claim 9, the support structure further comprising:

a first stop wall disposed on a first side of a second cable terminal; and a second stop wall disposed on a second side of the second cable terminal, the cable terminal and the second cable terminal forming a two-part cable;

wherein the first stop wall and the second stop wall limit side-to-side rotation of the second cable terminal.

11. The PDU of claim 1, the housing further comprising:

a plurality of cavities disposed on a bottom surface of the housing, the plurality of cavities to reduce a weight of the housing.

12. The PDU of claim 1, the housing further comprising:

a first rib disposed on a first side of the housing;

a second rib disposed on a second side of the housing, wherein the first side is parallel to the second side, the first and second ribs mitigating warpage of the first and second sides.

13. The PDU of claim 12, further comprising a top frame disposed orthogonally between the first side and the second side, the top frame improving structural integrity of the PDU.

14. The PDU of claim 13, wherein the top frame is disposed over the first rib and the second rib.

15. A power distribution unit (PDU) comprising:

a housing holding one or more fuses and one or more relays, the housing comprising a first side, a second side perpendicular to the first side, a third side perpendicular to the second side and parallel to the first side, and a fourth side perpendicular to the first side and parallel to the second side, the housing further comprising:

a first rib disposed on an inside wall of the first side, wherein the first rib is trapezoid-shaped;

a second rib disposed on an inside wall of the second side, wherein the second rib is trapezoid-shaped; and a top frame disposed over the first rib and the second rib, the top frame being perpendicular to the first side and the third side;

a cover secured over an opening of the housing; and a gasket sandwiched between the housing and the cover, the gasket forming an airtight seal between the housing and the cover.

16. The PDU of claim 15, the housing further comprising a plurality of cavities disposed on a bottom surface of the housing, the plurality of cavities reducing a weight of the housing.

17. The PDU of claim 15, further comprising a support structure inside the housing, the support structure holding one or more busbars, the support structure further comprising:

a first stop rib disposed on one side of a busbar of the one or more busbars, the busbar connected to a fuse; and a second stop rib disposed on a second side of the busbar;

wherein the first stop rib and the second stop rib limit side-to-side rotation of a cable terminal.

18. The PDU of claim 17, the support structure further comprising:

a first stop wall disposed one side of a second cable terminal; and a second stop wall disposed on a second side of the second cable terminal, the cable terminal and the second cable terminal being part of a two-part cable;

wherein the first stop wall and the second stop wall limit side-to-side rotation of the second cable terminal.

* * * * *